United States Patent [19]

Hampel et al.

[11] 4,376,630

[45] Mar. 15, 1983

[54] DRIVE COUPLING

[75] Inventors: Wilbur J. Hampel, Spring Park; Dana R. Lonn, Minneapolis, both of Minn.

[73] Assignee: The Toro Company, Minneapolis, Minn.

[21] Appl. No.: 179,968

[22] Filed: Aug. 21, 1980

[51] Int. Cl.³ ............................................. F16D 3/64
[52] U.S. Cl. ...................................... 464/88; 464/147
[58] Field of Search .......... 64/14, 9 R, 11 R, 27 NM; 464/75, 89, 150, 88, 87, 147

[56] References Cited

U.S. PATENT DOCUMENTS

| | | | |
|---|---|---|---|
| 2,199,926 | 5/1940 | Swennes | 64/14 |
| 2,259,460 | 10/1941 | Dexter | 64/23.5 |
| 2,560,644 | 7/1951 | Hartzell | 64/27 NM |
| 2,857,777 | 10/1958 | Porter | 64/11 R |
| 2,974,502 | 3/1961 | Radcliffe | 64/11 R |
| 3,175,110 | 3/1965 | Kohlhagen | 64/27 NM |
| 3,742,656 | 7/1973 | Amos | 464/88 |
| 3,823,577 | 7/1974 | Smith | 464/88 |
| 4,098,096 | 7/1978 | Charo et al. | 64/14 |

Primary Examiner—Ira S. Lazarus
Assistant Examiner—Magdalen Moy
Attorney, Agent, or Firm—James W. Miller

[57] ABSTRACT

A drive coupling is described which comprises a rubber article having a solid body section and a plurality of longitudinal ribs.

5 Claims, 3 Drawing Figures

DRIVE COUPLING

TECHNICAL FIELD

This invention relates to couplings useful for transmitting rotational force from one gear mechanism to another.

BACKGROUND OF THE INVENTION

Typical rigid or inflexible couplings (e.g. steel) may have high strength but in many applications such couplings exhibit certain inherent disadvantages. For example, rigid couplings do not allow for misalignment of the driving member and the driven member. Further, rigid couplings transmit torsional vibration and shocks from the working portion of the device to the power supply (e.g. an electric motor or internal combustion engine). The effect of such vibration and shocks may be, for example, increased wear on the drive train and damage to the power supply. Rigid couplings also transmit a considerable amount of noise.

Although certain types of flexible couplings have previously been described, none of such couplings have provided the advantages provided by the flexible couplings of the present invention. For example, the coupling described in U.S. Pat. No. 2,586,567 is designed in a manner such that metallic inserts at both ends of the coupling reinforce the coupling. In U.S. Pat. No. 4,098,096 the use of non-metallic inserts is described for press-fitting between a steel drive coupling and metallic involute shafts; thus, the non-metallic inserts are totally contained by metallic components. Similarly, U.S. Pat. No. 2,259,460 describes a resilient bushing which is entirely contained between metallic components, and U.S. Pat. No. 2,974,502 describes another type of non-metallic bushing or insert which is also entirely contained within metallic components.

SUMMARY OF THE INVENTION

In accordance with this invention there is provided a drive coupling comprising an integral rubber article having a solid elongate body section having a plurality of longitudinal ribs therealong, one end of the body section being of larger diameter and having a grooved recess therein which is adapted to slidably receive a drive member, wherein the axis of the recess is coaxial with the axis of the elongate body section.

The drive coupling of the present invention does not require that there be perfect alignment of the driving member and the driven member. Rather, the flexible and resilient coupling compensates for misalignment. Furthermore, the coupling of this invention may be made of less expensive materials than used for rigid metallic couplings, and it may be produced using conventional injection molding techniques. Also, the resilient coupling absorbs torsional vibration and other shocks so that they are not transmitted to the power supply, thereby avoiding excessive wear or damage to the drive train and the power supply. The resilient coupling may also function as a clutch by twisting and slipping in the metal gear to which it is designed to couple when excessive force is imparted to the coupling (e.g. caused by jamming of the device in which the coupling is used).

BRIEF DESCRIPTION OF THE DRAWINGS

The invention is described in more detail hereinafter with reference to the accompanying drawings wherein like reference characters refer to the same parts throughout the several views and in which.

DETAILED DESCRIPTION OF THE INVENTION

Figure 3:
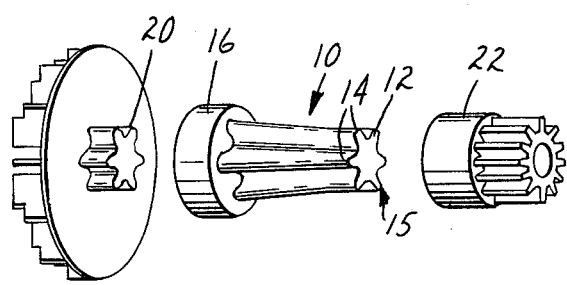
FIG. 3 is an exploded view of a drive mechanism employing the drive coupling of FIG. 1.

As shown in the drawings, drive coupling 10 of the invention comprises an integral rubber article having a solid elongate body section 12 having a plurality of longitudinal ribs 14 therealong. One end 16 of the body section is of larger diameter than the other part of the body section, and end 16 has a grooved recess 18 therein which is adapted to slidably receive a drive member 20 (as illustrated in FIG. 3). The axis of recess 18 is coaxial with the axis of body section 12. End 15 of the body section 12 is adapted to be received in a drive gear 22 having a complementarily shaped recess (not shown).

Preferably, there are six of the ribs 14 on body section 12 which are parallel to each other and equidistantly spaced around the periphery of the body section. It is also preferable for recess 18 to have six grooves 19 therein which are equidistantly spaced around the inside of the recess, as shown in the drawings. It is also preferred for the ribs 14, and the grooves 19, to be curved in cross-section so as to prevent concentration of stress.

Drive coupling 10 is an integral article made of rubber which is flexible and resilient but which has sufficient strength and toughness to withstand normal torque encountered in use. Generally it has been found that the rubber should have a Shore A hardness of at least 75 but not greater than 90. With a hardness below about 75 the rubber may have insufficient strength to withstand the torque normally encountered in use. With a hardness above about 90 the rubber is susceptible to fracturing when encountering impact loads at lower temperatures (e.g. below 0° F.). The preferred rubber is "Adiprene CM" which is commercially available from the E. I. duPont de Nemours Company, having a Shore A hardness of 80±5. Using techniques well known in the art, the drive coupling is made using an injection molding procedure.

Figure 1:
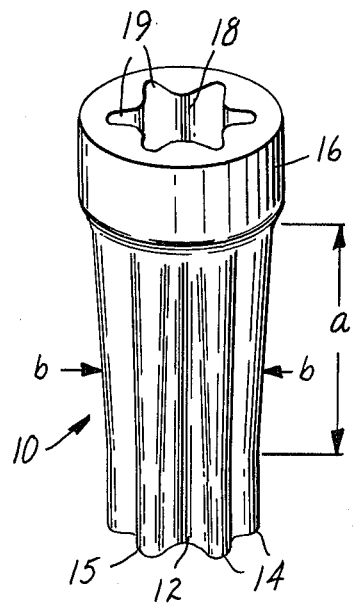
FIG. 1 is a perspective of a drive coupling of this invention.
Figure 2:
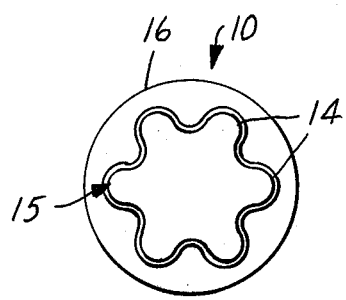
FIG. 2 is an end view of the coupling of FIG. 1.

It is highly preferred that the ratio of the length "a" of the drive coupling to its average diameter "b" (as shown in FIG. 1) be less than about 2.25 in order to have sufficient strength to prevent severe twisting when under heavy load. Even more preferred is an "a" to "b" ratio of less than 2 for normal operation.

Other variants of the present invention will be apparent to those of ordinary skill in the art.

What is claimed is:

1. A drive coupling comprising an integral rubber article having a solid elongate body section having a plurality of longitudinal ribs therealong, wherein said ribs are spaced equidistantly around the periphery of said body section and are parallel to each other such that one end of said body section is suited to be inserted into a complementarily shaped grooved bore of a driven member in a splined driving relationship, the other end of said body section being of larger diameter and having a grooved recess therein which is adapted to sildably receive a drive member in a splined driving relationship, wherein the axis of said recess is coaxial with the axis of said elongated body section, and wherein the rubber material of which said body section is made has a Shore A hardness of at least 75.

2. A drive coupling in accordance with claim 1, having six of said ribs along its length.

3. A drive coupling in accordance with claim 1, wherein said recess has six grooves therein which are equidistantly spaced around said recess.

4. The drive coupling in accordance with claim 1, wherein each of said ribs is curved in cross-section.

5. A drive coupling in accordance with claim 1, wherein the ratio of the length "a" of said coupling to its average diameter "b" is less than about 2.25 to 1.

* * * * *